(12) United States Patent
Pakzad et al.

(10) Patent No.: US 7,076,391 B1
(45) Date of Patent: Jul. 11, 2006

(54) METHODS AND SYSTEMS FOR ASYNCHRONOUSLY TESTING A PLURALITY OF DISK DRIVES

(75) Inventors: Mostafa Pakzad, Palos Verdes Peninsula, CA (US); Minh N. Trinh, Irvine, CA (US); Ronald L. Nelson, Yorba Linda, CA (US); Joseph M. Viglione, Laguna Hills, CA (US); James M. Mang, Laguna Hills, CA (US); Suleyman Attila Yolar, Irvine, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 772 days.

(21) Appl. No.: 10/286,146

(22) Filed: Oct. 31, 2002

(51) Int. Cl.
*G06F 19/00* (2006.01)

(52) U.S. Cl. .......................... 702/118; 702/57; 702/81; 702/117; 324/73.1; 324/210; 324/755; 324/158.1; 361/685; D14/337; D14/348

(58) Field of Classification Search .................. 702/57, 702/81, 117, 118; 324/73.1, 210–266, 755–758, 324/158.1; 361/685; D14/337, 348
See application file for complete search history.

(56) References Cited

U.S. PATENT DOCUMENTS

| 4,348,761 | A | * | 9/1982 | Berger | 714/718 |
| 6,505,281 | B1 | * | 1/2003 | Sherry | 711/168 |
| 6,865,514 | B1 | * | 3/2005 | Goguen et al. | 702/186 |

OTHER PUBLICATIONS

Zunzanyika et al., 'Simultanious Development & Qualification In the Fast-Changing 3.5" Hard-Disk-Drive Technology', 1995, IEEE Publication, pp. 27-32.*
Automated Production Test Solutions; Xyratex Brochure downloaded from Xyratex Web Site Oct. 28, 2002. Electronic file indicates document created Aug. 8, 2002.

* cited by examiner

*Primary Examiner*—Hal Wachsman
*Assistant Examiner*—Elias Desta
(74) *Attorney, Agent, or Firm*—Jason T. Evans, Esq.; Young Law Firm (57) ABSTRACT

An asynchronous system for testing disk drives includes a test platform that includes a plurality of slots for receiving and for providing communication with drives. The slots are segregated into a plurality of groups configured to satisfy predetermined environmental, communication bandwidth and test schedule requirements of the drives to be loaded therein. An automated loader/unloader is configured to selectively load drives into and out of the platform and to move drives between the plurality of groups. A module controller is assigned to each group of slots, each module controller being coupled to the slots of its assigned group and configured to administer at least one test to drives loaded in its assigned group while insuring that the predetermined environmental, communication bandwidth and test schedule requirements of its assigned group remain satisfied. A test matrix controller controls the loader/unloader to asynchronously move each drive that passes the test(s) administered in one group to a selected empty slot of another group for administration of a next test, to asynchronously move each drive that completes or fails the series of tests out of the platform. The moving steps are carried out without compromising the respective environmental, communication bandwidth and test schedule requirements of the plurality of groups.

25 Claims, 10 Drawing Sheets

METHODS AND SYSTEMS FOR ASYNCHRONOUSLY TESTING A PLURALITY OF DISK DRIVES

BACKGROUND OF THE INVENTION

1. Field of the Invention

This invention relates to methods and systems for asynchronously testing and carrying out procedures on magnetic disk drives.

2. Description of the Prior Art and Related Information

Figure 1:
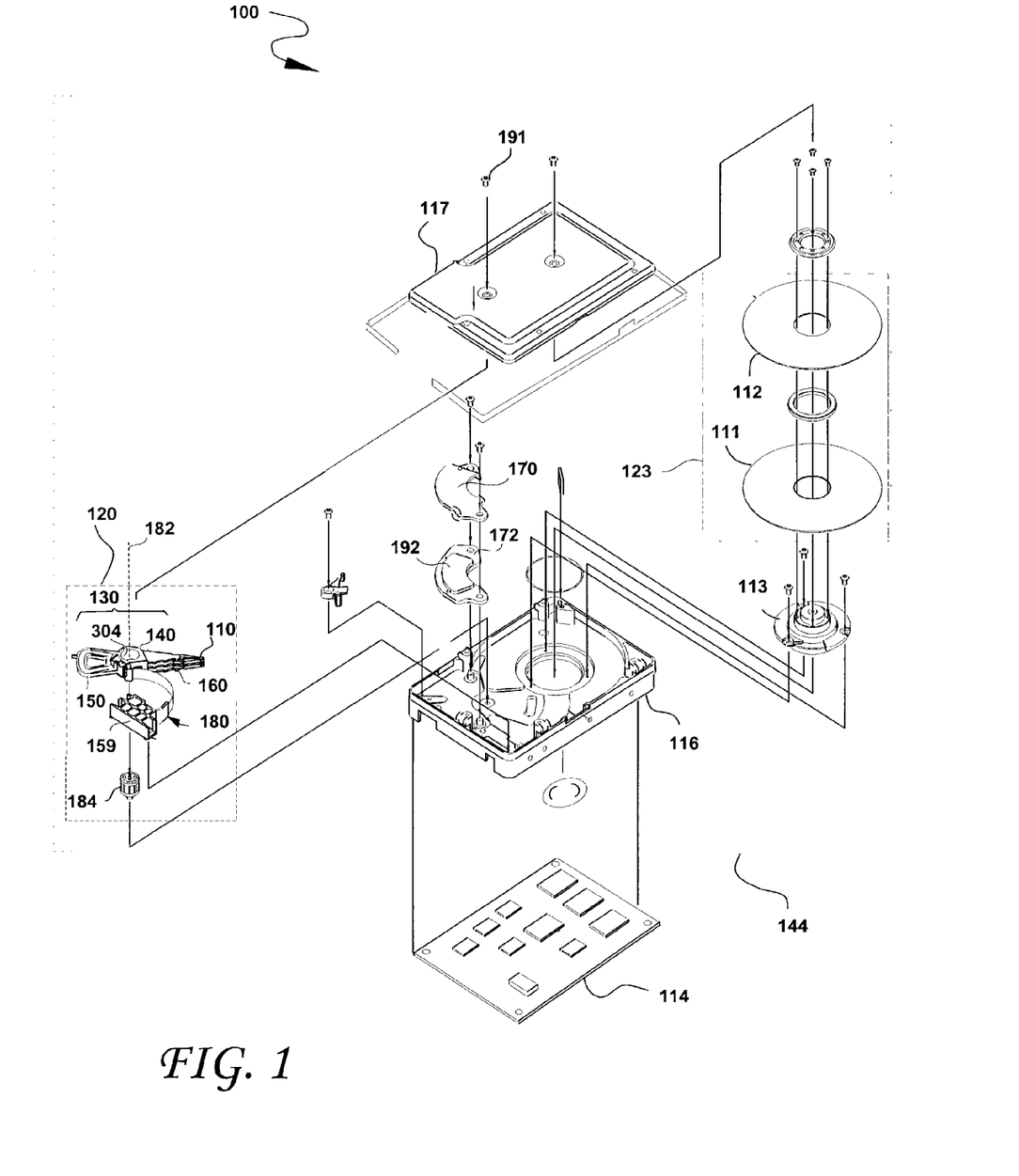
FIG. 1 is a diagram of the major components of a disk drive.

FIG. 1 shows the principal components of a magnetic disk drive 100 such as may be tested by the asynchronous disk drive testing system and according to the methods of the present invention. With reference to FIG. 1, the disk drive 100 comprises a head disk assembly (HDA) 144 and a printed circuit board assembly (PCBA) 114. The HDA 144 includes a disk drive enclosure comprising base 116 and a cover 117 attached to the base 116 that collectively house a disk stack 123 that includes one or a plurality of magnetic disks (of which only a first disk 111 and a second disk 112 are shown), a spindle motor 113 attached to the base 116 for rotating the disk stack 123, an HSA 120, and a pivot bearing cartridge 184 that rotatably supports the head stack assembly (HSA) 120 on the base 116. The spindle motor 113 rotates the disk stack 123 at a constant angular velocity. The HSA 120 comprises a swing-type or rotary actuator assembly 130, at least one head gimbal assembly (HGA) 110, and a flex circuit cable assembly 180. The rotary actuator assembly 130 includes a body portion 140, at least one actuator arm 160 cantilevered from the body portion 140, and a coil portion 150 cantilevered from the body portion 140 in an opposite direction from the actuator arm 160. The actuator arm 160 supports the HGA 110 that, in turn, supports the slider(s). The flex cable assembly 180 may include a flex circuit cable and a flex clamp 159. The HSA 120 is pivotally secured to the base 116 via the pivot-bearing cartridge 184 so that the slider at the distal end of the HGA 110 may be moved over the surfaces of the disks 111, 112. The pivot-bearing cartridge 184 enables the HSA 120 to pivot about a pivot axis, shown in FIG. 1 at reference numeral 182. The storage capacity of the HDA 144 may be increased by, for example, increasing the track density (the TPI) on the disks 111, 112 and/or by including additional disks in the disk stack 123 and by an HSA 120 having a vertical stack of HGAs 110 supported by multiple actuator arms 160.

The "rotary" or "swing-type" actuator assembly comprises a body portion 140 that rotates on the pivot bearing 184 cartridge between limited positions, a coil portion 150 that extends from one side of the body portion 140 to interact with one or more permanent magnets 192 mounted to back irons 170, 172 to form the voice coil motor (VCM), and the actuator arm 160 that supports the HGA 110. The VCM causes the HSA 120 to pivot about the actuator pivot axis 182 to cause the slider and the read write transducers thereof to sweep radially over the disk(s) 111, 112.

After the HDA 144 and the PCBA 114 are mated, the disk drive must undergo a variety of tests and procedures to configure and validate the proper operation of the disk drive. Such testing conventionally is carried out in a "single plug tester", which is a test platform that includes a bank of slots into which the disk drives are manually loaded and unloaded. A sequential series of tests and procedures are then carried out on the loaded disk drives. Some of the test and procedures are subject to strict environmental control requirements. Conventionally, the drives remain in the same slot during the administration of the entire sequence of tests, and are removed in batch only at the conclusion of the sequence of tests.

It may be appreciated, however, that such a test platform architecture may lead to inefficiencies. Some of these inefficiencies are organic to the structure of the test platform and to its batch mode of operation, while other inefficiencies stem from various evolutionary changes in the disk drives themselves. At the outset, the batch mode of operation of single plug testers limit the platform's throughput to the time required for the slowest drive to complete the prescribed sequential series of tests. Drives that may complete the sequential series faster than other (for whatever reason) or fail any test must sit idle and occupy a slot that would otherwise be available for the administration of tests to another disk drive. Some evolutionary changes of the disk drives themselves that affect the operation of conventional test platforms include the ongoing transition from drives having a parallel interface (e.g., EIDE drives) to drives having a serial interface (such as Serial Advanced Technology Architecture or SATA). However, even during this transition to serial drives, there remains a non-negligible demand for drives having a parallel interface. Therefore, from a manufacturing point of view, both parallel and serial drives must continue to be manufactured, at least during this period of transition. Moreover, the capacities of such drives can vary over a wide range. For example, if drives are based upon an 80 Gbyte platter, then 80 Gbyte drives, 160 Gbyte and 240 Gbyte drives may be produced, possibly along with other capacities. To complicate matters, the time required for defect mapping and administration (which operations are carried out in the test platform) is directly proportional to the density of the drive, rendering the batch operation of conventional testers problematic if drives of different capacities are to be processed simultaneously. It is apparent, therefore, that disk drive manufacturers are faced with manufacturing a wide variety of disk drives of different capacities and interfaces. The testing and validation of such a wide variety of drives using conventional single plug testers is burdensome and costly.

From the foregoing, it may be appreciated that new test systems and methods are needed. In particular, what are needed are methods and systems for testing a plurality of drives that do not suffer from the inefficiencies of conventional test platforms and that allow the simultaneous testing of drives having a range of interfaces and capacities. As drive testers represent large capital expenditures for disk drive manufacturers, a more efficient tester increases throughput, lowers costs and may allow manufacturers to use a reduced-footprint test platform, which further saves costly factory floor space.

SUMMARY OF THE INVENTION

According to one aspect thereof, this invention can be regarded as a method of testing a plurality of disk drives in a test platform configured to administer a sequential series of tests on the plurality of disk drives. The test platform includes a plurality of slots that are configured to receive and to provide communication with respective ones of the plurality of disk drives. The plurality of slots are segregated into a plurality of groups, and each group is configured to satisfy predetermined environmental, communication bandwidth and test schedule requirements of the disk drives to be loaded therein. According to an embodiment thereof, the method may include steps of identifying disk drives that are ready to undergo designated ones of the series of tests and loading the identified disk drives into empty slots of groups appropriate to the designated ones of the sequential series of tests and administering at least one test of the sequential series of tests to the loaded disk drives. Thereafter, without compromising the environmental, communication bandwidth and test schedule requirements of each group, asynchronously moving each disk drive, upon having passed the at least one administered test, to an empty slot of another selected group of the plurality of groups for administration of a next test within the sequential series of tests; asynchronously moving each disk drive that completes the sequential series of tests out of the test platform and asynchronously moving any drive that fails any of the series of test out of the test platform. The method may then revert back to identifying step.

Communicating steps may be carried out to communicate data, control and status information with the disk drives loaded into the slots during administration of each of the sequential series of test. The communicating steps may be carried out by one or more module controllers coupled to each of the plurality of groups of slots.

The administering step may be carried out by one or more module controllers coupled to each of the plurality of groups of slots. The moving steps may be controlled by a robot controlled by a test matrix controller, the test matrix controller being coupled to each of the module controllers. A greater number of channels in the test platform may be provided for a first group of slots that requires a high communication bandwidth with the module controller(s) than for a second group of slots that requires a relatively lower communication bandwidth with the module controller(s). The method may further include a step of multiplexing the control, data and status information from a channel coupled to the module controller to a selected one of a plurality of slots coupled to the channel. The communicating and the multiplexing steps may be carried out while respecting a protocol selected from serial ATA, parallel ATA, SCSI, Fibre Channel, FireWire or USB, for example. Preferably, the communicating and multiplexing steps are carried out at the maximum data rate supported by the selected protocol.

According to another aspect thereof, the present invention is also an asynchronous disk drive system for testing a plurality of disk drives, comprising a test platform, an automated loader/unloader and one or more module controllers. The test platform may include a plurality of slots, each slot being configured to receive and to provide communication with a disk drive, the plurality of slots being segregated into a plurality of groups. Each group is configured to satisfy predetermined environmental, communication bandwidth and test schedule requirements of the disk drives to be loaded therein. The automated loader/unloader may be configured to selectively load disk drives into and out of the test platform and to move disk drives between the plurality of groups. One or more module controllers may be assigned to each group of slots, each module controller being coupled to the slots of its assigned group, each module controller being configured to administer at least one of a plurality of sequential tests to disk drives loaded in the slots of its assigned group. The test matrix controller may be configured to communicate with each module controller and to control the automated loader/unloader. The automated loader/unloader may be controlled to move each disk drive that passes the test(s) administered in one group to a selected empty slot of another group of the plurality of groups for administration of a next test within the sequential series of tests. The automated loader/unloader may also be configured to asynchronously move each disk drive that completes the sequential series of tests out of the test platform, and to asynchronously move any drive that fails any of the series of test out of the test platform. All of the moving steps are carried out without compromising the respective predetermined environmental, communication bandwidth and test schedule requirements (sequential order and timing) of the plurality of groups.

The automated loader/unloader may be a robotic loader/unloader. Each module controller may be coupled to a plurality of channels, each channel of the plurality of channels being configured to enable communication between the module controller and at least one slot belonging to the group of slots assigned to the module controller. Slots that are configured to administer a test that requires a high communication bandwidth with the module controller may each be coupled to a respective single one of the plurality of channels. Slots that are configured to administer a firmware load and software preparation test or a microcode download test or final tests may each be coupled to single channel. At least one of the plurality of channels may be coupled to a plurality of slots that are configured to administer a test that requires a low communication bandwidth with the module controller. At least one of the plurality of channels may be coupled to a plurality of slots configured to administer a seeded self-servo write test or to a plurality of slots configured to administer a burn in self-test. The number of slots to which each channel is coupled may increase as the required communication bandwidth between the module controller and the slots of the module controller's assigned group of slots decreases. The number of slots assigned to each group may be proportional to the length of time necessary to complete the tests administered in each group. Each channel may include an engine for performing data transfers over a parallel interface with the module controller, a data buffer coupled to the engine and a serial interface coupled to the engine, the serial interface being configured to output serial data to at least one slot. The serial interface may be configured to output data according to a serial ATA (SATA) protocol, for example. The engine for performing data transfers may be configured to perform data transfers according to an ultra direct memory access (UDMA) protocol. Each slot may be configured to selectively communicate with a drive loaded therein over a serial or a parallel interface. Each channel may communicate with the module controller over a PCI bus interface, for example. The test matrix controller may be coupled to the automated loader/unloader and to each of the module controllers via an Ethernet connection, for example.

DESCRIPTION OF PREFERRED EMBODIMENTS

Figure 2:
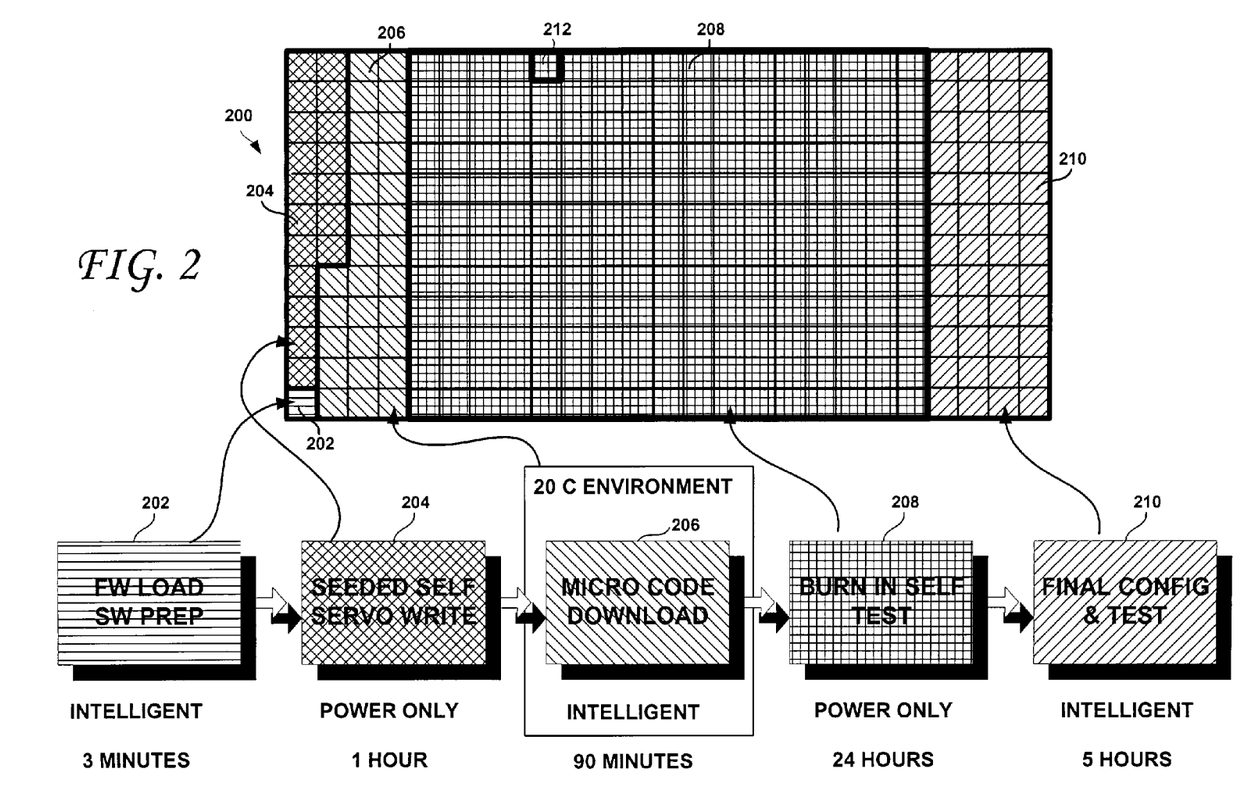
FIG. 2 is a functional diagram of a test wall for carrying out a sequential series of test or procedures on disk drives, illustrating aspects of an embodiment of the present invention.

FIG. 2 is a functional diagram of a test wall 200 for carrying out a sequential series of test or procedures on disk drives. As shown, the test wall 200 includes a plurality of slots, such as slot 212, into which the drives under test may be loaded and unloaded to administer a sequential series of tests or procedures on the drives. Each slot is configured to receive a disk drive under test (such as shown at 100 in FIG. 1) and provide communication between the drive under test and a host, such as a module controller discussed below. The plurality of slots 212 of the test wall 200 is segregated into a plurality of groups. Each group of slots 212 may be configured to satisfy predetermined environmental (such as, for example, temperature, humidity, etc.), communication bandwidth and test schedule requirements of the drives under test to be loaded therein. As shown, the number of slots 212 in each of the groups may be roughly proportional to the time required the tests or procedures to be carried out on the drives loaded in the slots of the group. Underneath the test wall 200 of FIG. 2 is an exemplary series of sequential tests detailing the tests and procedures to be sequentially carried out by the test systems and methods of the present invention. For example, the groups of slots 212 may include a first group 202 of slots 212 dedicated to loading necessary firmware and software into the drives loaded therein. The approximate time required to carry out the tests and/or procedures on the drives under test are noted under each group, it being understood that these times are included herein for exemplary purposes only. As shown, the software and firmware loading in group 202 takes a comparatively short period of time, on the order of about three minutes. Also noted under each of the groups is the legend "Intelligent" or "Power Only", depending on whether the drives under test require communication with a host. Groups labeled "Intelligent" require that the drives under test loaded in the group communicate with a host, such as a module controller (discussed below), whereas groups labeled "Power Only" do not require communication with a host and require power only to complete the tests and/or procedures to be carried out within the group.

The next group 204 of slots 212 in the exemplary test schedule shown in FIG. 2 supports a seeded self-servo write procedure, in which servo information is written to the disk or disks of the drive under test loaded therein. During this procedure, servo sector information is being written to the drive without using a servo track writer. As servo track writing is a time consuming process that is directly proportional to the aerial density of the disk, reducing the number of servo sectors the servo track writer lays down on the disk saves manufacturing time and costs. By reducing the number of servo sectors written by the servo track writer to, for example, every other servo sector and allowing the seeded self-servo write procedure carried out in the group 204 to interpolate between the written servo sectors, significant saving in both the time and costs are achieved. In such a process, the servo track writer writes a number of reference tracks and the seeded self-servo write procedure essentially performs an inbetweening process to write servo tracks between the reference tracks written by the servo track writer. Group 204 does not require communication with a host, as the software necessary to perform the seeded self-servo write has been previously downloaded to the drive while the drive was loaded into one of the slots 212 of group 202.

The next group 206 of slots 212 supports the microcode download, which is preferably carried out in an environmentally controlled environment, such as 20° C. As the microcode is downloaded from a host, communications between the drive under test loaded into the slots 212 of the group 206 and the host (a module controller) are necessary, hence the label "Intelligent" for group 206. The group having the largest number of slots 212 is the group 208 in which the tests that take the longest time to complete are administered. Group 208 supports the initial burn in self-test (IBI self test), in which a lengthy calibration of the drive is performed, as well as procedures to discover, map and manage the defects on the media. The length of time necessary to complete this test is roughly proportional to the storage capacity of the drive under test.

The next and final group 210 of slots may be dedicated to administering final configurations and tests. This group 210 requires communication with a host computer, so as to verify the proper operation of host commands and analyzing and validating the results of the IBI self-test carried out in the group 208. Desired performance characteristics of the drive, such as head seek time, for example, may be verified within this group 210 of slots 212, if desired. It is understood that other tests and procedures may be carried out on the drives under test, in addition or in place of the tests discussed above, such as a debug process when a fault is found during testing. Such debug tests may be performed to isolate the fault, so as to facilitate the correction thereof.

Figure 3:
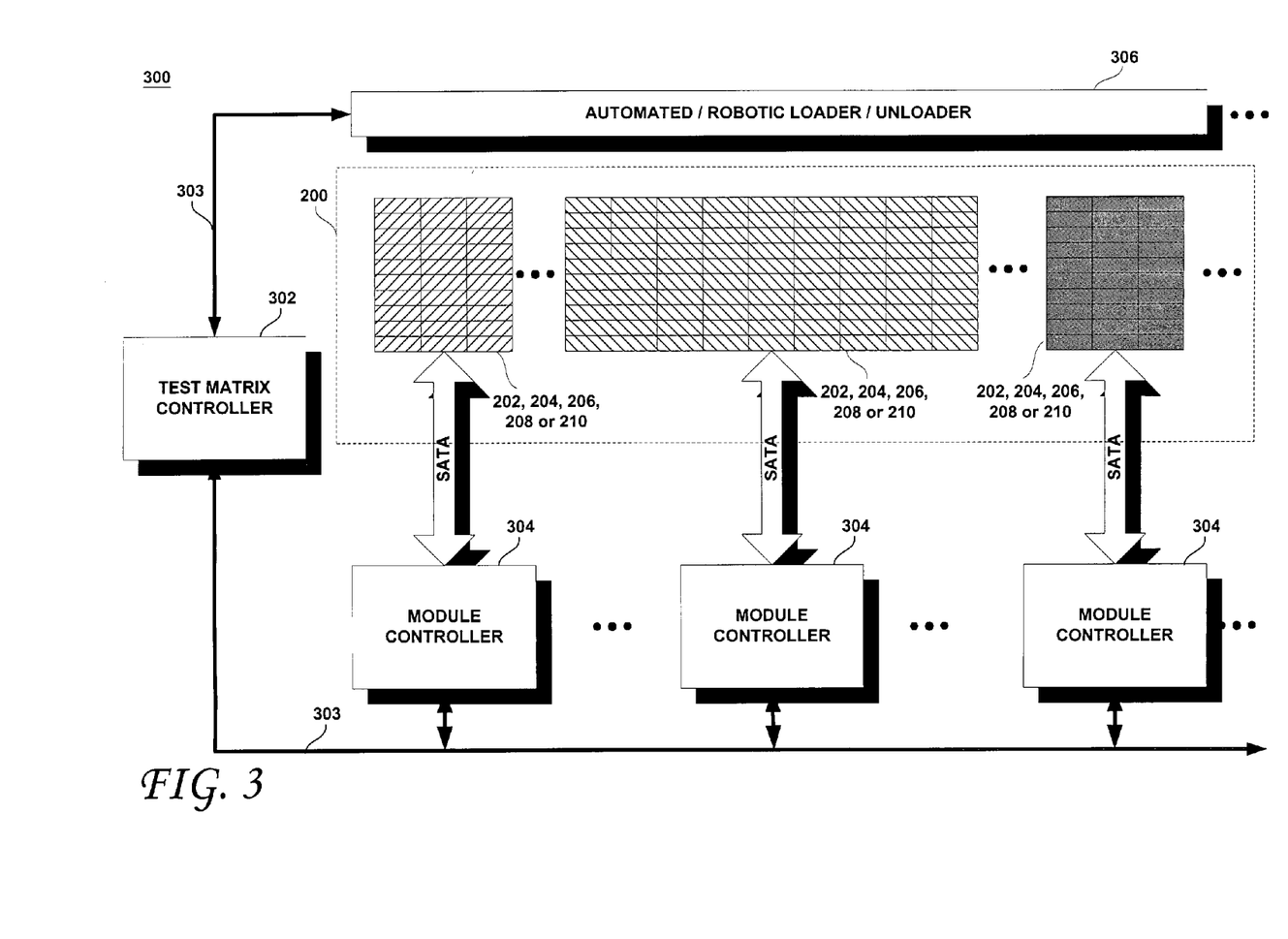
FIG. 3 is a diagram of an asynchronous disk drive system for testing a plurality of disk drives, according to an embodiment of the present invention.

FIG. 3 is a diagram of an asynchronous disk drive system 300 for testing a plurality of disk drives, according to an embodiment of the present invention. The system 300 includes a test platform 200 that includes a plurality of slots 212, each slot 212 being configured to receive and to provide communication with a disk drive under test. As detailed above, the plurality of slots is segregated into a plurality of groups 202, 204, 206, 208 or 210 and each such group is configured to satisfy predetermined environmental, communication bandwidth and test schedule requirements of the disk drives to be loaded therein. In particular, each of the slots 212 may be self-contained with respect to environmental, communication bandwidth and test schedule requirements, thereby enabling any of the disk drives loaded into or unloaded from any of the slots 212 without affecting any of the other drives loaded in any of the other slots 212 and without affecting the testing or procedures carried out on the drives. Also shown is an automated loader/unloader 306 that is configured to selectively load disk drives into and out of the test platform 200 and to move disk drives between slots of the plurality of groups. Portions of the system 300 (such as the test wall 200) may be obtained from, for example, Xyratex International of San Jose, Calif. (on the World Wide Web at www.xyratex.com). According to one embodiment of the present invention, the automated loader/unloader is robotic, and is coupled to and controlled by a computer, shown in FIG. 3 as the test matrix controller 302. The test matrix controller 302, according to the present invention, is aware of the current status of each drive under test within the system 200 through the module controllers 304. The test matrix controller 302 also issues the commands that cause the automated loader/unloader to move the drives into and out of the system 200, as well as between groups thereof. The matrix controller 302 may be coupled to the automated loader/unloader and to the module controllers 304 via an Ethernet connection 303, for example. One or more module controller computers 304 are assigned to each group 202, 204, 206 or 208 of slots 212. Each group 202, 204, 206 or 208 has at least one module controller 304 assigned thereto and connected to its constituent slots 212. Each module controller 304 is configured, according to the present invention, to act as an I/O controller for the drives to which it is connected and to administer at least one of the sequential tests to the disk drives loaded in the slots 212 of its assigned group, all the while insuring that the predetermined environmental, communication bandwidth and test schedule requirements of its assigned group remain satisfied. The test matrix controller 302 is coupled to and communicates with each module controller 304 and is also coupled to and controls the automated loader/unloader 306 as it moves disk drives under test into the test platform 200, out of the test platform and between groups 202, 204, 206 or 208.

The movement of each disk drive into, out of and between groups 202, 204, 206 or 208 of the test platform 200 is carried out asynchronously by the automated loader/unloader 306. That is, the present invention does not wait for all disk drives under test loaded into the slots 212 of a given group to have finished the administered test and does not move the disk drives in batch mode out of the test platform or to slots of another group. Instead, as individual disk drives fail any test or procedure, pass a test or complete a procedure or complete the entire series of sequential tests, they are moved asynchronously, as and when needed. This leads to great efficiencies in the full usage of the slots 212 of the test platform, as drives are moved in and out of the test platform and within the test platform as needed, and are not limited by the slowest drive finishing the administered test or the entire test sequence. According to an embodiment of the present invention, the module controllers 304 communicates with the drives under test loaded into the slots 212 according to the serial Advanced Technology Architecture (ATA) point-to-point protocol. SATA is a widely used acronym for the serial ATA protocol. Current implementations of the SATA protocol call for data rates at 1.5 Gbits/sec or multiples thereof. Both the test matrix controller 302 and the module controllers 304 may be or include personal computers (PCs) running, for example, a Linux operating system or a Microsoft operating system, such as Windows 2000 Professional for example.

Figure 4:
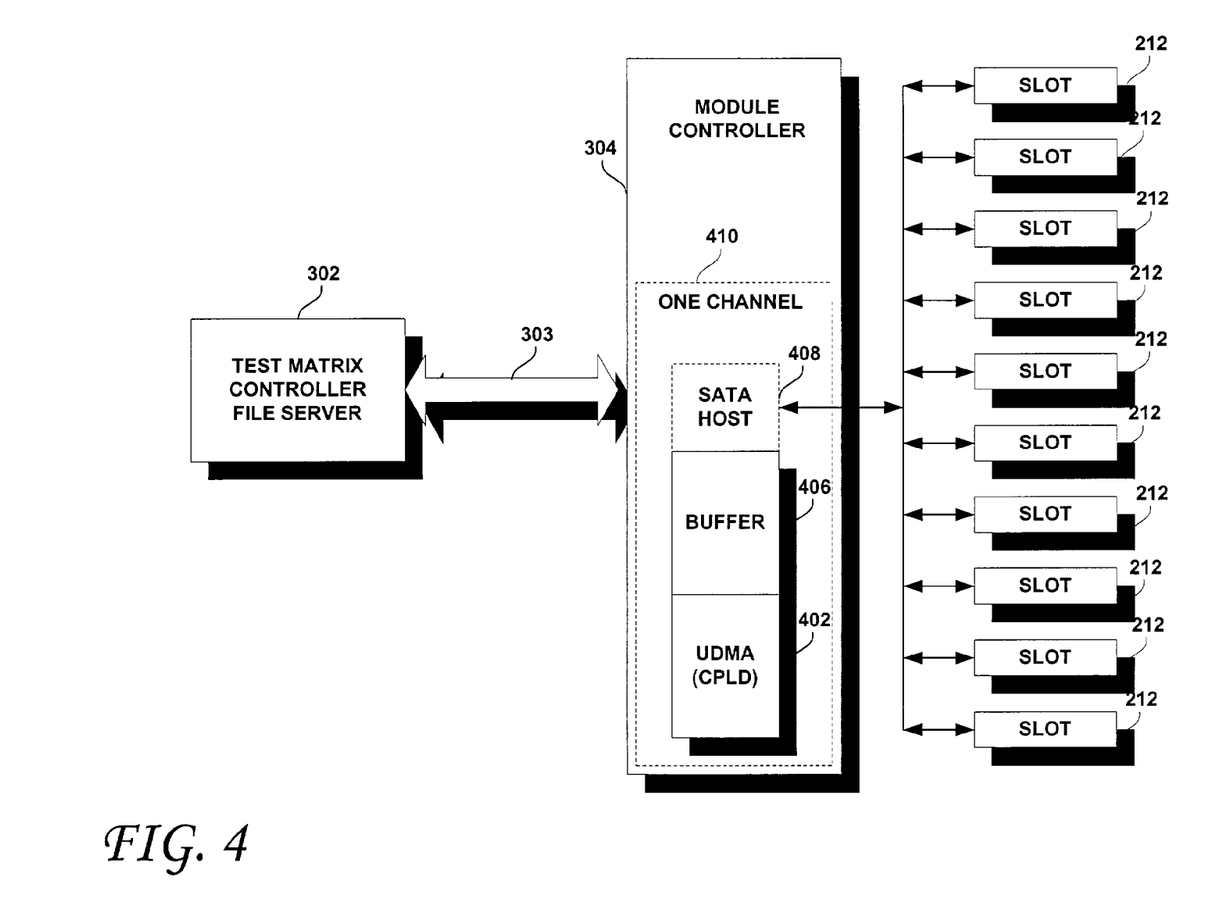
FIG. 4 shows further aspects of a module controller according to an embodiment of the present invention, and its relationship to the test matrix controller and slots of the test wall.

FIG. 4 shows further aspects of a module controller 304 according to an embodiment of the present invention, and its relationship to the test matrix controller 302 and slots 212 of the test wall 200. One communication channel 410 of a module controller 304 is shown coupled to a plurality of slots 212. According to an embodiment of the present invention, each channel 410 may include an Ultra Direct Memory Access (Ultra DMA or UDMA) module 402, which may be a complex programmable logic device, or CPLD. The UDMA module 402 is a parallel interface that typically uses a 40-pin cable. Coupled to the UDMA module 402 is a memory buffer 406 for storage of commands and data to be sent to the drive under test and a SATA host interface 408 for translating the parallel data from the UDMA module 402 into serial form conforming to the SATA protocol. The SATA host 408 is coupled to a plurality of slots 212, in a manner to be described in greater detail below.

Figure 5:
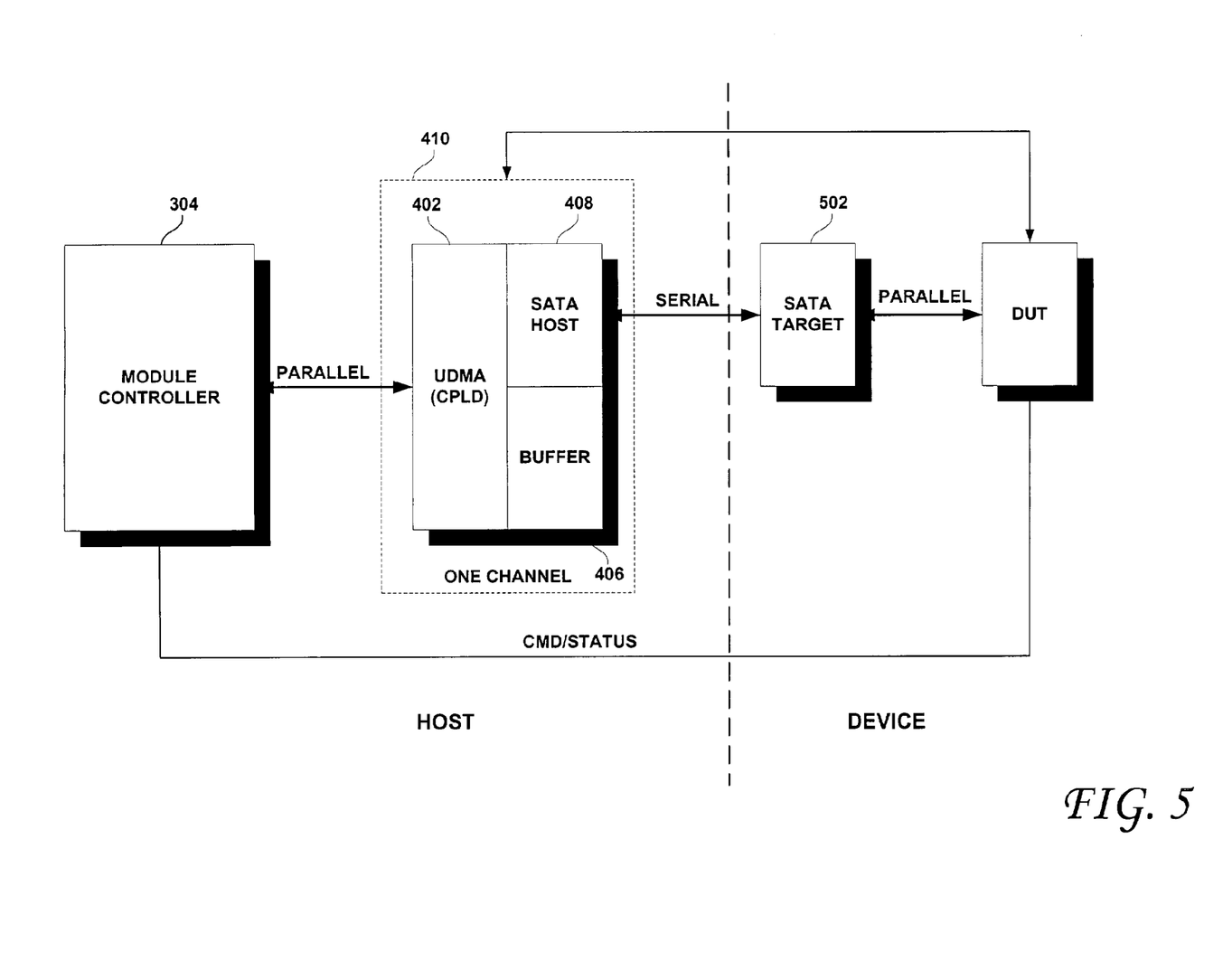
FIG. 5 illustrates further aspects of a communication channel between a module controller and a device under test, according to an embodiment of the present invention.

FIG. 5 illustrates further aspects of a communication channel between a module controller 304 and a device under test, according to an embodiment of the present invention. As shown, the communication between the module controller 304 and the channel 410 may be via a parallel connection and the communication out to the device under test may be carried out serially, via a SATA (at least 1.5 Gbits/sec). In the case wherein the drive under test has a parallel interface (EIDE or Parallel ATA), a bridge chip 502 may be interposed between the channel 410 and the device under test, to convert be serial SATA data into parallel form. To limit parasitic capacitances (among other reasons), the length of the connection between the channel 410 and the bridge chip should be 1.5 meters or less. The communication between the bridge chip 502 and the drive under test may be carried out according to a standard drive protocol, such as the UDMA 100 (100 MHz) or UDMA133 (133 MHz) protocols, for example. The bridge chip 502, of course, is not necessary if the drive under test has a SATA interface. Alternatively, a switch may be present to route the incoming SATA data directly to a SATA disk drive or through the bridge chip 502 for conversion into parallel data for an EIDE drive under test. The UDMA engine 402 may communicate with an internal bus of the module controller 304 through one or more internal buses (32 bit buses, for example) for the transfer of addresses, commands and data.

Figure 6:
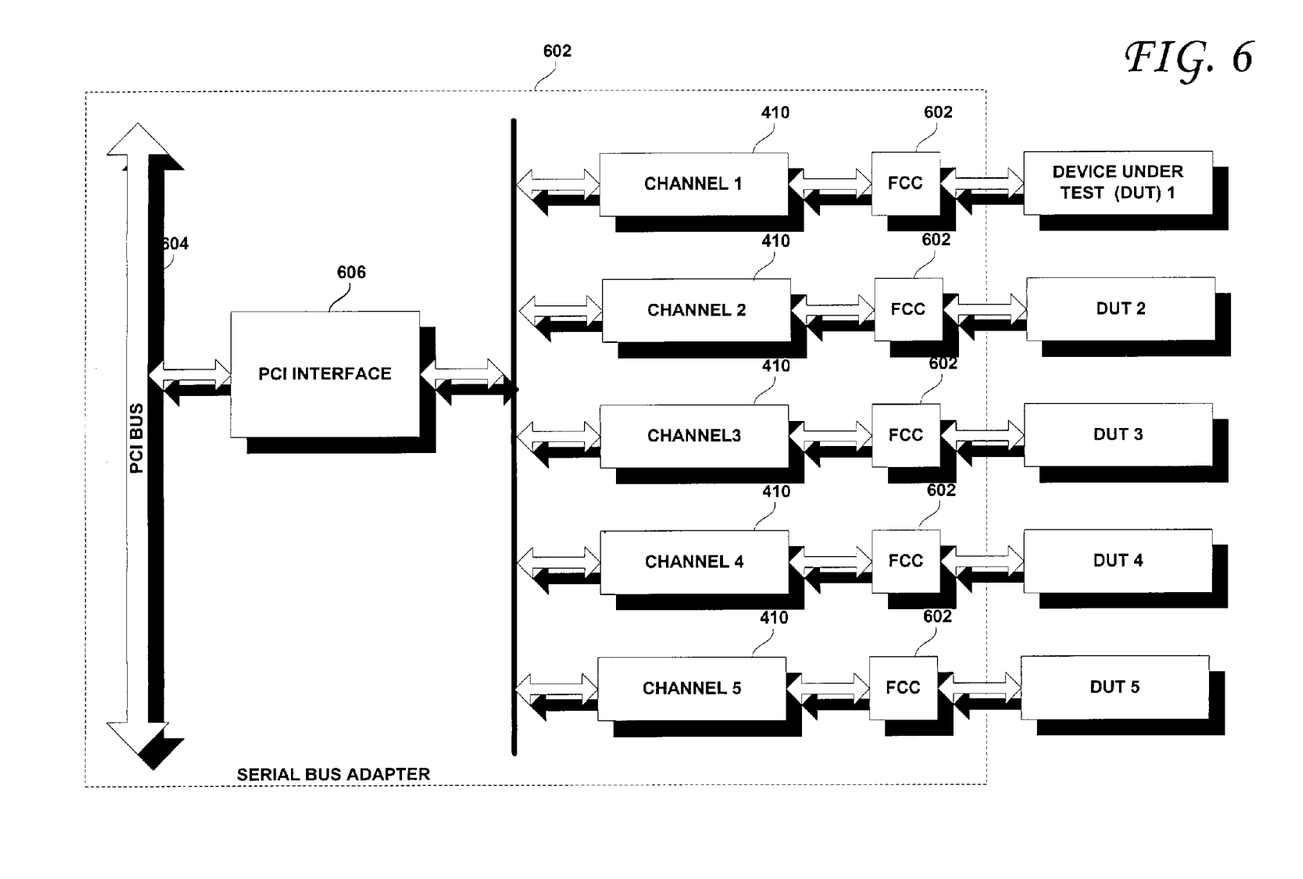
FIG. 6 shows aspects of the communication path between a module controller and the devices under tests, according to an embodiment of the present invention.

FIG. 6 shows further aspects of the communication path between the module controller 304 and the devices under test, according to an embodiment of the present invention. The module controller 304 may include one or more serial bus adapters (SBA), as shown in FIG. 6 at 602. Each SBA 602 may include a PCI bus 604 and a PCI interface, as shown at 606. The PCI interface (which may be embodied in a CPLD, for example), may be connected to an internal bus to which a number of channels 410 are coupled. According to an embodiment of the present invention, five channels 410 may be coupled to the PCI interface 606. Each of the channels 410 may have the structure shown in FIG. 5. In turn, each channel may be coupled, via a SATA interface, for example, to a Feature Connection Card (FCC) 602, which may include the serial/parallel switch referred to relative to FIG. 5 as well as the bridge chip 502 that converts between the SATA and EIDE formats.

Figure 7:
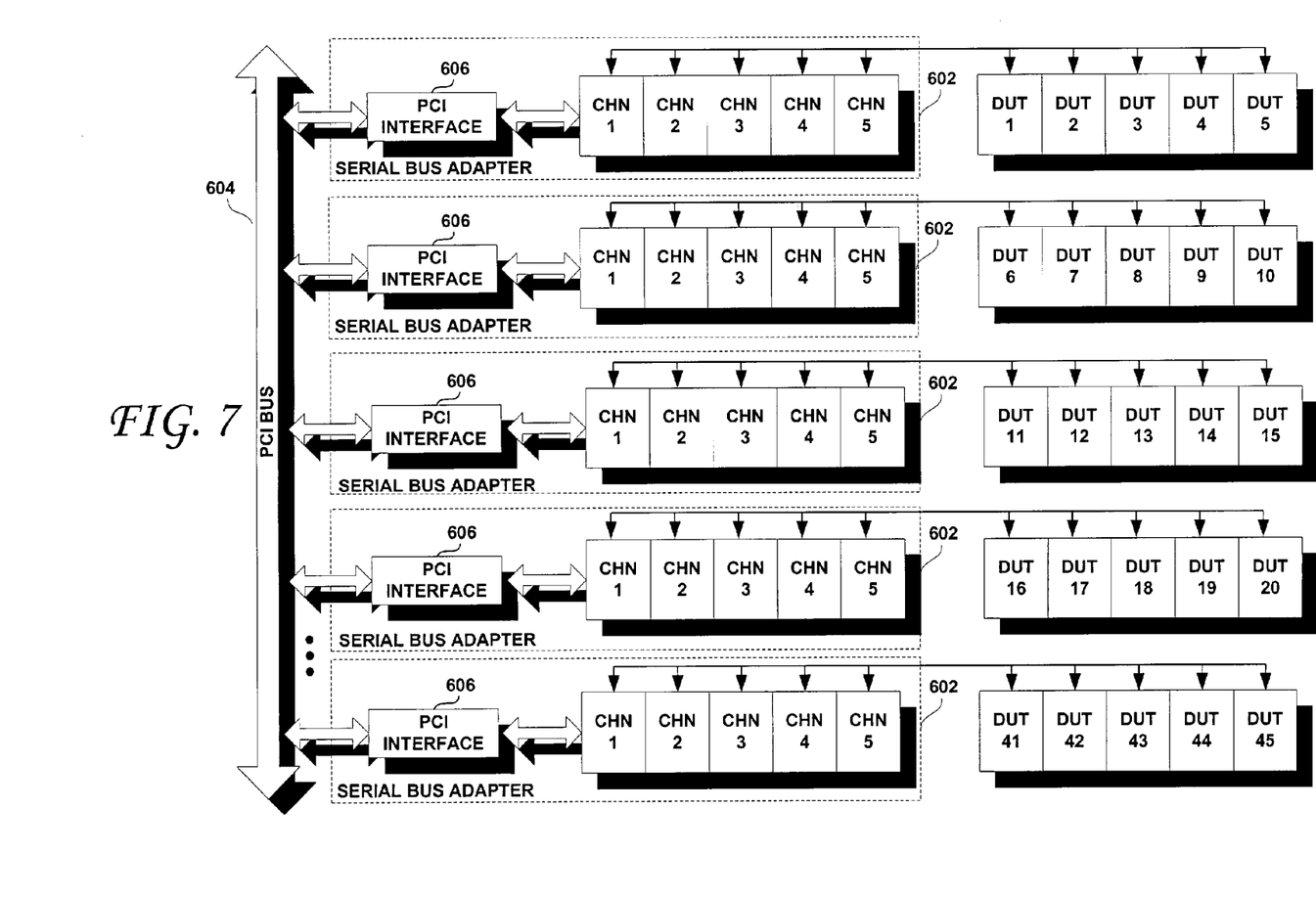
FIG. 7 shows further aspects of the communication path between the module controller and the devices under test, according to an embodiment of the present invention.

FIG. 7 shows further aspects of the couplings between the module controllers 304 and the devices under test, according to an embodiment of the present invention. As shown, according to one embodiment of the present invention, each module controller 304 may include a PCI (for example) bus with nine (for example) slots, and each slot may be configured to accommodate a SBA, such as shown in FIG. 6 at 602. In turn, each SBA 602 may be coupled to five channels such as shown at 410 in FIG. 5. The number of SBAs 602 and the number of channels per SBA 602 may be limited by board space, PCI bus loading, bandwidth requirements and the like. Note that neither the bridge chip 502 not the FCC switch described above is shown in FIG. 7, for clarity of illustration purposes only. Moreover, FIG. 7 shows that 45 channels (and 45 devices under test) may be coupled to each module controller 304. However, 45 channels is but one possible design choice and the present invention may be practiced using a greater or lesser number of SBAs 602, a greater or lesser number of channels 410 per SBA 602 and/or a greater number of devices under test coupled to each channel 410 than shown and described herein without departing from the spirit and scope of the present invention.

Figure 8:
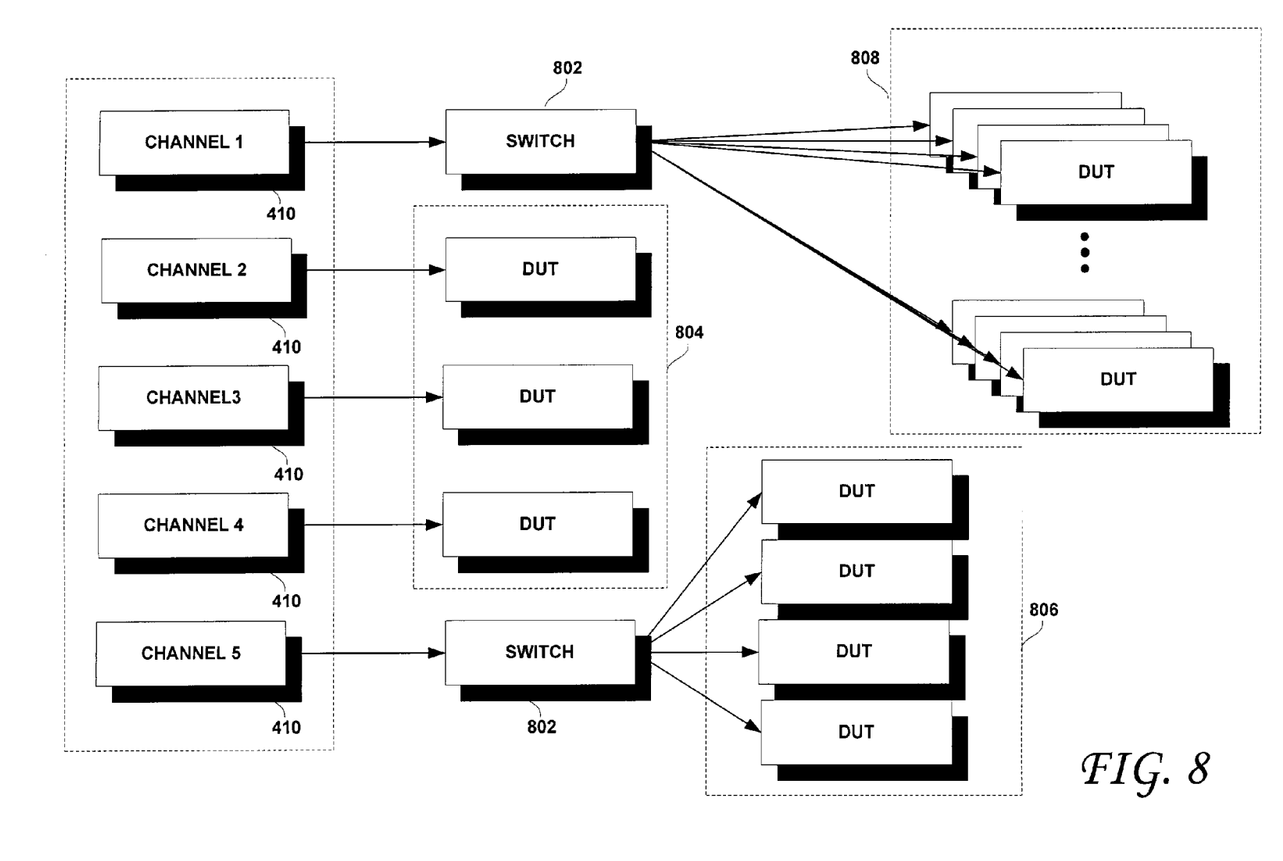
FIG. 8 shows further aspects of the couplings between the module controllers and the devices under test, according to an embodiment of the present invention.

As alluded to above, each channel 410 may be coupled to one or more devices or drives under test. Specifically, for groups of slots 212 in which data-intensive tests or procedures are carried out that require most, substantially all or all of the available channel bandwidth, only one drive under test (and thus only one slot 212) is coupled to each channel 410, as shown in FIG. 8. For such tests or procedures, therefore, there is preferably a 1:1 relationship between the channel 410 and the drive under test, as shown at 804. Slots 212 that are assigned to a group carrying out the final configuration tests (see, for example, reference numeral 210 in FIG. 2) may each be coupled to a single channel 410. However, some tests and procedures do not consume all or even substantially all of the available channel bandwidth. For example, the tests sometimes collectively referred to as the initial drive test (IDT) is such a test. The IDT may include a power-on test, followed by a check of the basic performance of the seeking, reading and writing functions of the drive. The IDT may be referred to as having only medium data transfer requirements. Therefore, more than one slot 212 (and thus drive under test) assigned to a group that performs the IDT and like tests may be coupled to each channel 410. A switch 802, running at interface (SATA, or example) speed, may carry out a multiplexing function to route commands, status information and data to and from a number of drives under test coupled to the switch 802. For example, four drives may be coupled to a single channel, resulting in an exemplary 1:4 relationship between the channel 410 and the drives under test, as shown at 806 in FIG. 8. Alternatively still, an even greater number of drives under test may be coupled to a single channel 410. For example, in the case wherein the slots 212 are assigned to a group of slots that is configured to carry out non-data intensive tests or procedures (e.g., that do not require much or any communication with the module controller host 304), a great many slots 212 may be coupled to a single channel 410, as shown at 808. In such cases, communications with the module controller 304 is often limited to the occasional transmission of control information and the monitoring of status information from the drive under test. For example, the seeded self-servo write test 204 and the burn-in self-test 208 have relatively low bandwidth requirements and the slots 212 assigned to groups carrying out such tests and procedures likely would be coupled to only a few channels 410, thereby creating a 1:n relationship between the channels 410 and the slots 212 and the drives under test loaded therein. It may be stated that the number of slots 212 to which each channel 410 is coupled increases as a required communication bandwidth between the module controller 304 and the slots 212 of the module controller's assigned group of slots decreases. Also, the number of slots 212 assigned to each group 410 may be proportional to the length of time necessary to complete the tests administered in each group.

Figure 9:
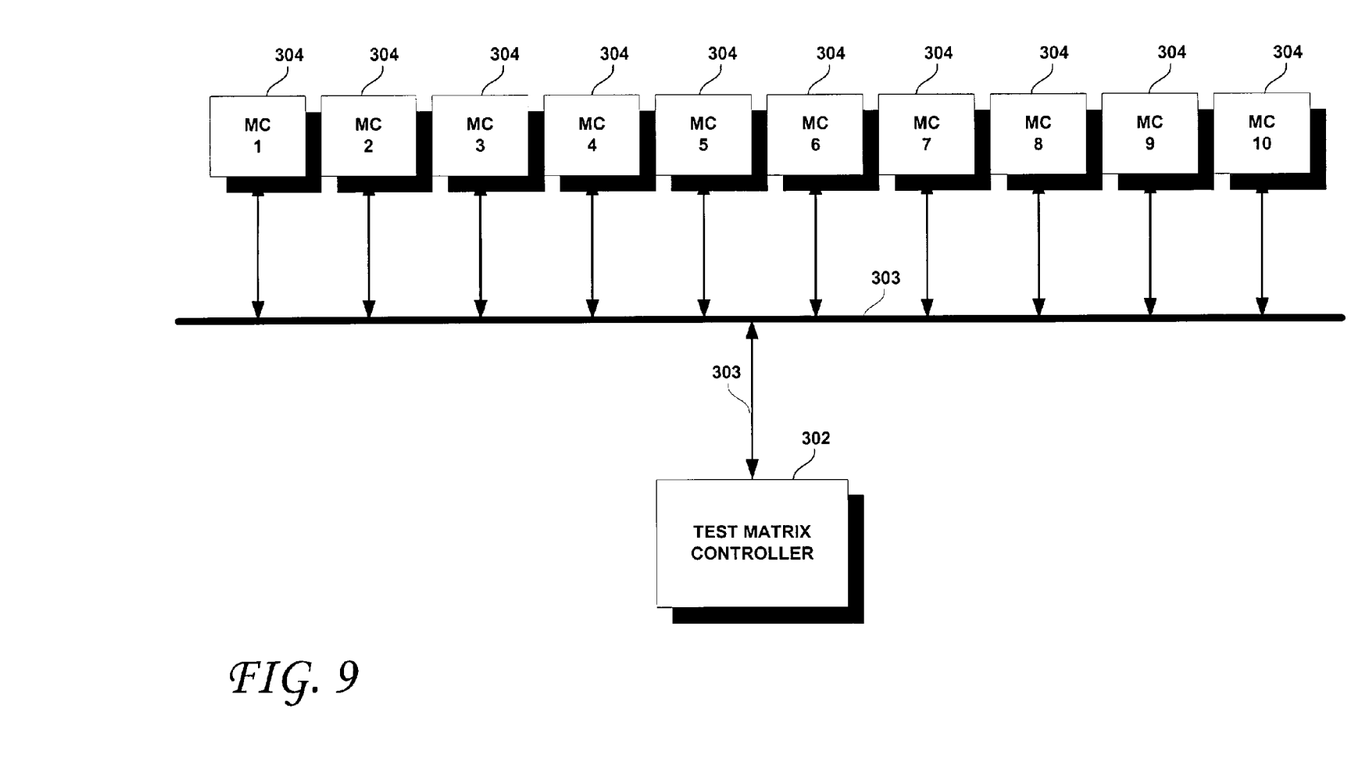
FIG. 9 shows the connection between the test matrix controller file server and a plurality of module controllers, according to an embodiment of the present invention.

FIG. 9 illustrates the scalability of the present invention, in which a plurality of module controllers 304 are coupled and controlled by the test matrix controller 302. In the illustrated embodiment, ten module controllers 304 are coupled to the test matrix controller 302, although a greater or lesser number of module controllers 304 may be connected thereto. Not shown in FIG. 9 is the automated loaded/unloader 306 or the test wall 200 of slots 212.

Figure 10:
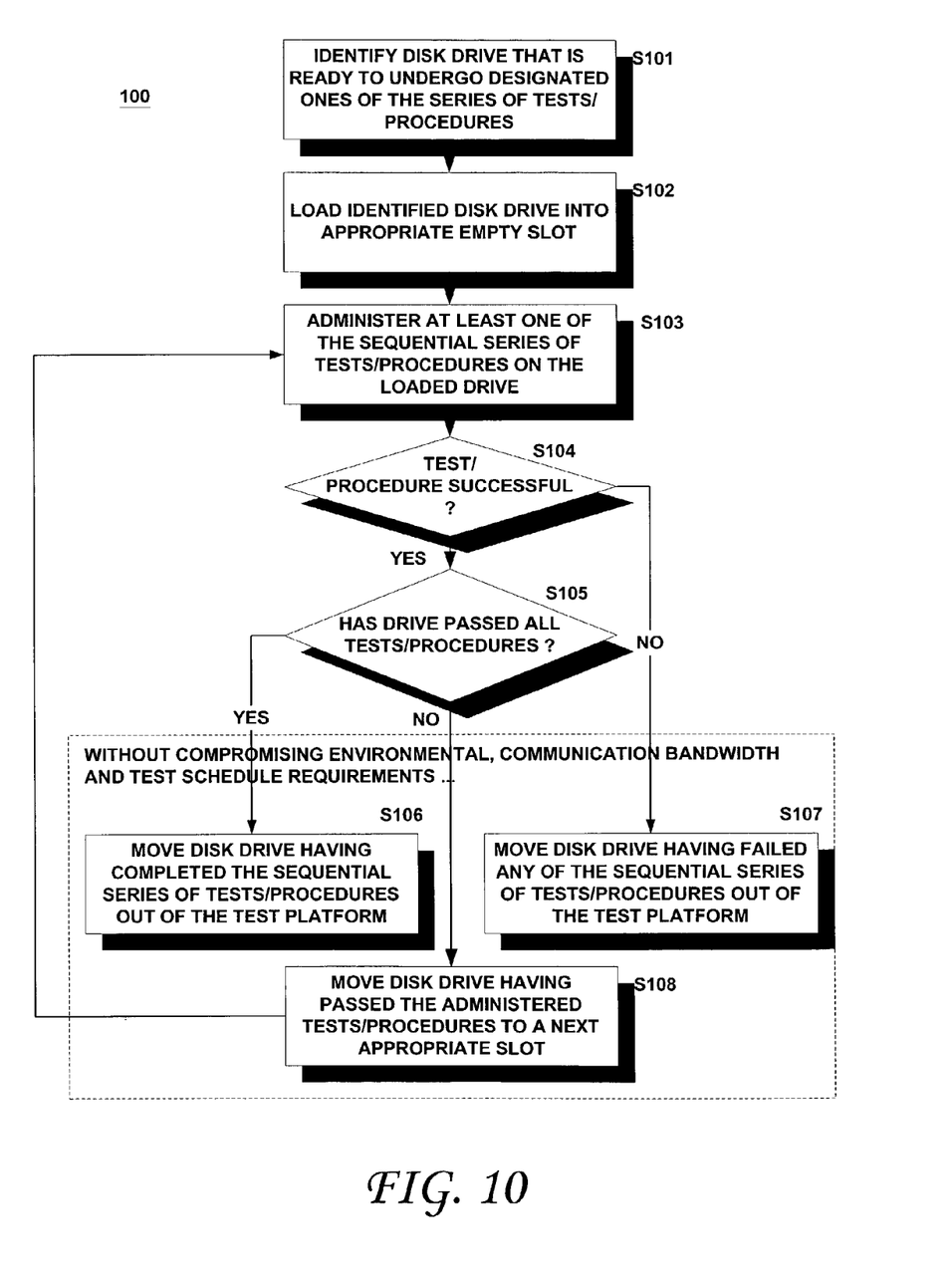
FIG. 10 is a flowchart illustrating aspects of the method of testing a plurality of disk drives in a test platform configured to administer a sequential series of tests on a plurality of disk drives, according to an embodiment of the present invention.

FIG. 10 is a flowchart illustrating aspects of the present method 100 for testing a plurality of disk drives in a test platform that is configured to administer a sequential series of tests on the plurality of disk drives, according to an embodiment of the invention. As shown therein, step S101 calls for the identification of disk drives that are ready to undergo a test or procedure of the sequential series of tests. A drive that is ready to undergo a test or a procedure is one that has not yet undergone the first test or procedure of the sequential series, or one that has successfully completed one or more tests or procedures but that has not yet completed the entire sequence of tests or procedures. The drive that has been identified in steps S101 as being ready to undergo a test or a procedure is then loaded into an appropriate empty slot, as shown at S102. An appropriate slot is an empty slot (i.e., no drive is currently loaded therein) and that is assigned to a group that is configured to carry out a next test or procedure of the sequential series of tests or procedures. In step S103, one or more tests or procedures are carried out on the drive loaded into the slot 212, administered by a module controller 304. If the administered test or procedure is determined to have been unsuccessful as determined by communications between the drive under test and the module controller 304 coupled thereto (or lack of communication therewith), the test matrix controller 302 may command the automated loader/unloader 306 to asynchronously move the disk drive having failed the test or procedure out of the test platform 200, as outlined in step S107. This move is carried out without compromising the prevailing environmental, communication bandwidth and test schedule requirements of the other slots 212 of the test wall 200 or of the other drives under test. Also, this move may be carried out as soon as the automated loader/unloader is available to do so, without waiting for the other drives under test within the slot's group to finish the tests or procedures. In other words, the movement of drives in and out of the slots 212 of the test wall 200 need not be in batch mode, but may be adapted to be responsive to the contemporaneous requirements of the drives under test and the contemporaneous availability of slots.

If step S104 determines that the test or procedure was successfully completed, it may be determined, in step S105, whether the drive under test has completed all of the tests or procedures of the sequential series. If not, the loader/unloader 306 may be commanded to move the drive under test to a nest appropriate and available slot 212. For example, the drive under test may have downloaded all of its microcode (reference 206 in FIG. 2) and may be ready to be asynchronously moved to an available slot in the group 208 of slots configured to administer the burn-in self-test. The method may then revert to step S103. Again, the slots 212 and the loader/unloader 306 are configured so to enable this move to be effectuate without affecting environmental, communication and test schedule requirements of the other drives under test. If, in step S105, it is determined that the drive has indeed passed all of the prescribed tests and procedures of the sequential series of tests, the disk drive may then asynchronously be moved out of the test platform, as shown at S106.

It is to be noted that although the present invention is presented herein as communicating with the drive via the SATA and UDMA 100 protocols, the present invention is not limited thereto. Other communication protocols may be used including, for example, SCSI, Fibre Channel, FireWire (IEEE1394), USB or other existing or yet to be developed protocols. Preferably, the communications with the drives under test are carried out at interface speed, meaning the maximum data transfer rates specified by the protocol.

Advantageously, the present invention enables a more efficient usage of the slot real estate in the test wall 200. Also, drives of different capacities may be tested simultaneously, there being no requirement that all drives under test match, either in capacity or communication interface. For example, some of the drives may be SATA drives, while others may be parallel ATA (EIDE), for example. The asynchronous nature of the moving, loading and unloading of the drives into and out of slots that are self-contained with respect to environmental, bandwidth and test schedule requirements enables such a flexible use of the available slots 212, as compared with a synchronous batch process, in which drives are moved en masse, upon finishing any test or procedure.

We claim:

1. A method of testing a plurality of disk drives in a test platform configured to administer a sequential series of tests on the plurality of disk drives, the test platform including a plurality of slots that are configured to receive and to provide communication with respective ones of the plurality of disk drives, the plurality of slots being segregated into a plurality of groups, each group being configured to satisfy predetermined environmental, communication bandwidth and test schedule requirements of the disk drives to be loaded therein, the method comprising:

identifying disk drives that are ready to undergo designated ones of the series of tests;

loading the identified disk drives into empty slots of groups appropriate to the designated ones of the sequential series of tests and administering at least one test of the sequential series of tests to the loaded disk drives;

without compromising the environmental, communication bandwidth and test schedule requirements of each group, asynchronously:

moving each disk drive, upon having passed the at least one administered test, to an empty slot of another selected group of the plurality of groups for administration of a next test within the sequential series of tests;

moving each disk drive that completes the sequential series of tests out of the test platform; and moving any drive that fails any of the sequential series of tests out of the test platform.

2. The method of claim 1, further including communicating steps to communicate data, control and status information with the disk drives loaded into the slots during an administration of each of the sequential series of tests, the communicating steps being carried out by at least one module controller coupled to each of the plurality of groups of slots.

3. The method of claim 1, wherein the administering step is carried out by at least one module controller coupled to each of the plurality of groups of slots.

4. The method of claim 2, wherein the moving steps are controlled by a robot controlled by a test matrix controller, the test matrix controller being coupled to each of the module controllers.

5. The method of claim 2, further comprising the step of providing a greater number of channels in the test platform for a first group of slots that requires a high communication bandwidth with the at least one module controller than for a second group of slots that requires a relatively lower communication bandwidth with the at least one module controller.

6. The method of claim 2, wherein the communicating steps are selectively carried out according to a protocol selected from serial ATA, parallel ATA, SCSI, Fibre Channel, FireWire (IEEE1394) and USB.

7. The method of claim 6, wherein the communicating steps are carried out at a maximum data rate supported by the selected protocol.

8. The method of claim 2, further comprising a step of multiplexing the control, data and status information from a channel coupled to the module controller to a selected one of a plurality of slots coupled to the channel.

9. The method of claim 8, wherein the multiplexing step is carried while respecting a protocol selected from serial ATA, parallel ATA, SCSI, Fibre Channel, FireWire and USB.

10. The method of claim 9, wherein the multiplexing steps are carried out at a maximum data rate supported by the selected protocol.

11. An asynchronous disk drive system for testing a plurality of disk drives, comprising:

a test platform that includes a plurality of slots, each slot being configured to receive and to provide communication with a disk drive, the plurality of slots being segregated into a plurality of groups, each group being configured to satisfy predetermined environmental, communication bandwidth and test schedule requirements of the disk drives to be loaded therein;

an automated loader/unloader configured to selectively load disk drives into and out of the test platform and to move disk drives between the plurality of groups;

a module controller assigned to each group of slots, each module controller being coupled to the slots of its assigned group, each module controller being configured to administer at least one of a sequential series of tests to disk drives loaded in the slots of its assigned group while insuring that the predetermined environmental, communication bandwidth and test schedule requirements of its assigned group remain satisfied;

a test matrix controller configured to communicate with each module controller and to control the automated loader/unloader to, without compromising the respective predetermined environmental, communication bandwidth and test schedule requirements of the plurality of groups, asynchronously move each disk drive that passes the at least one test administered in one group to a selected empty slot of another group of the plurality of groups for administration of a next test within the sequential series of tests, each disk drive that completes the sequential series of tests out of the test platform, and any drive that fails any of the sequential series of tests out of the test platform.

12. The system of claim 11, wherein the automated loader/unloader is a robotic loader/unloader.

13. The system of claim 11, wherein each module controller is coupled to a plurality of channels, each channel of the plurality of channels being configured to enable communication between the module controller and at least one slot belonging to the group of slots assigned to the module controller.

14. The system of claim 13, wherein slots that are configured to administer a test that requires a high communication bandwidth with the module controller are each coupled to a respective single one of the plurality of channels.

15. The system of claim 14, wherein slots that are configured to administer a firmware load and software preparation test or a microcode download test or final tests are each coupled to single channel.

16. The system of claim 13, wherein at least one of the plurality of channels is coupled to a plurality of slots configured to administer a test that requires a low communication bandwidth with the module controller.

17. The system of claim 16, wherein at least one of the plurality of channels is coupled to a plurality of slots configured to administer a seeded self-servo write test or to a plurality of slots configured to administer a burn in self-test.

18. The system of claim 13, wherein a number of slots to which each channel is coupled increases as a required communication bandwidth between the module controller and the slots of the module controller's assigned group of slots decreases.

19. The system of claim 11, wherein a number of slots assigned to each group is proportional to a length of time necessary to complete the tests administered in each group.

20. The system of claim 13, wherein each channel includes an engine for performing data transfers over a parallel interface with the module controller, a data buffer coupled to the engine and a serial interface coupled to the engine, the serial interface being configured to output serial data to at least one slot.

21. The system of claim 20, wherein the serial interface is configured to output data according to a serial ATA (SATA) protocol.

22. The system of claim 20, wherein the engine for performing data transfers is configured to perform data transfers according to an ultra direct memory access (UDMA) protocol.

23. The system of claim 11, wherein each slot is configured to selectively communicate with a drive loaded therein over a serial or a parallel interface.

24. The system of claim 13, wherein each channel communicates with the module controller over a PCI bus interface.

25. The system of claim 13, wherein the test matrix controller is coupled to the automated loader/unloader and to each of the module controllers via an Ethernet connection.

* * * * *

UNITED STATES PATENT AND TRADEMARK OFFICE
CERTIFICATE OF CORRECTION

PATENT NO. : 7,076,391 B1  
APPLICATION NO. : 10/286146  
DATED : July 11, 2006  
INVENTOR(S) : Mostafa Pakzad et al.

Page 1 of 1

It is certified that error appears in the above-identified patent and that said Letters Patent is hereby corrected as shown below:

Col. 12, Line 56, delete "falls" and insert --fails-- therefor.

Signed and Sealed this

Ninth Day of January, 2007

JON W. DUDAS  
*Director of the United States Patent and Trademark Office*